United States Patent Office 2,993,507
Patented July 25, 1961

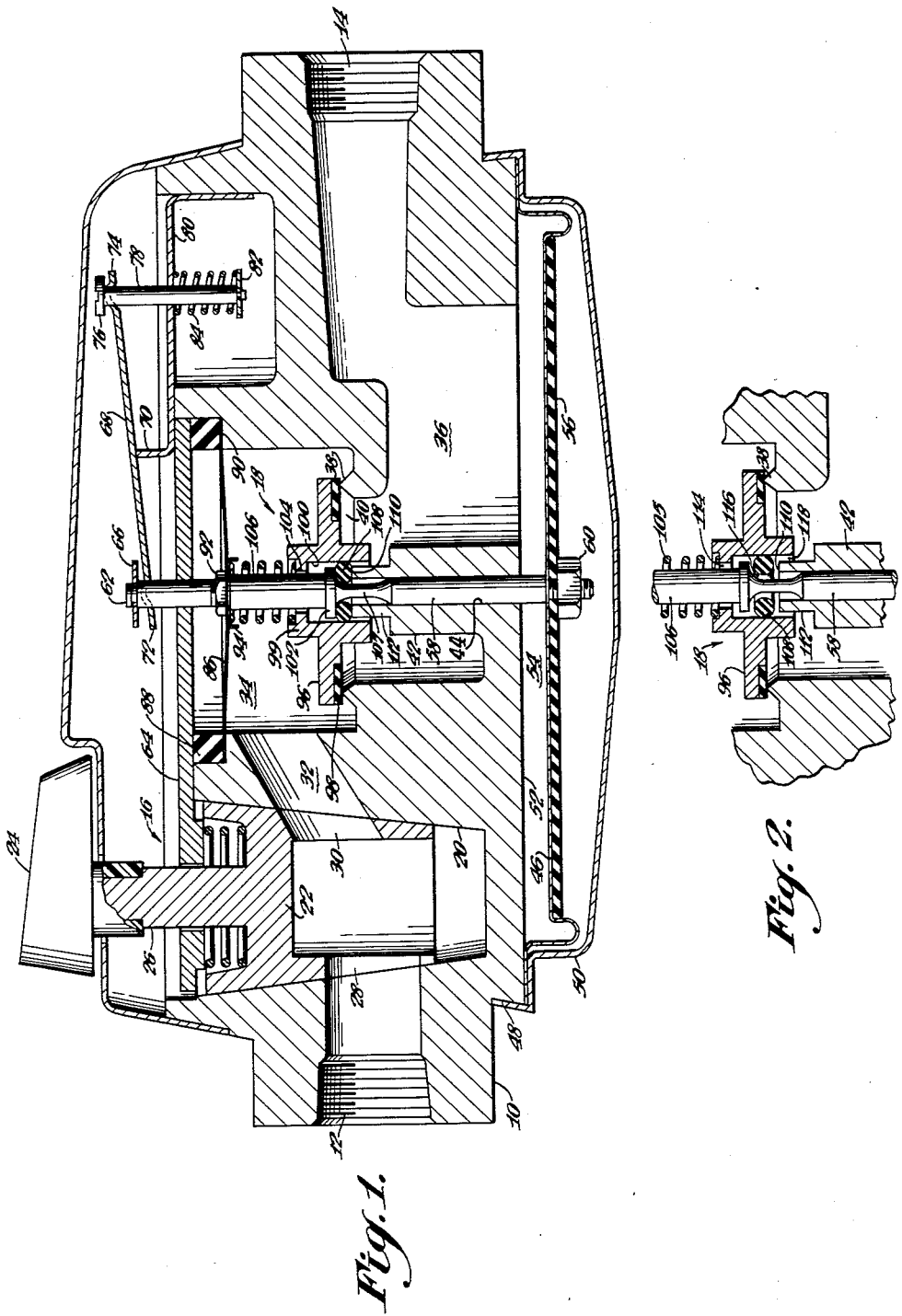

2,993,507
PRESSURE REGULATOR
James U. Daly, Latrobe, Pa., assignor to Robertshaw-Fulton Controls Company, Richmond, Va., a corporation of Delaware
Filed Apr. 10, 1958, Ser. No. 727,570
4 Claims. (Cl. 137—505.42)

This invention relates generally to devices for controlling the flow of fluid and more particularly to double-seated pressure regulator valves.

This invention finds particular utility in controlling the flow of fluid to pilot-controlled fluid fuel burners and the like. In controlling the flow of fuel to fluid fuel burners, it is desirable to regulate the flow to the main burner within a wide range and to maintain a sufficient minimum flow to the pilot burner even when the flow to the main burner is no longer required. For efficient operation of the burner under these operating conditions, it is generally necessary that the flow required by the pilot burner be minute as compared to the large flow required by the main burner. In cases where the pilot gas take-off communicates with the conduit leading to the main burner, it will be apparent that it would be extremely difficult to regulate with one valve member both the large flow required by the main burner and the minute flow required by the pilot burner.

An object of this invention is to insure accurate pressure regulation in valves of the above indicated character at both large fluid flows and minute fluid flows.

Another object of this invention is to regulate minute gas flow in a valve of the above-indicated character at pressures only slightly higher than the pressure at which the large gas flow is regulated.

Another object of this invention is to regulate the minute gas flow in a double-seated pressure regulator valve only after the large valve is closed.

Another object of this invention is to regulate both the large gas flow and the minute gas flow through a double-seated pressure regulator valve with only one diaphragm and one valve stem.

In a preferred embodiment of the invention, a valve casing defines an inlet chamber and an outlet chamber. A main valve seat communicates with the outlet chamber which may be connected to the main fuel line and pilot take-off of a fluid fuel burner. A movable diaphragm, responsive to the pressure in the outlet chamber, is connected to a valve stem on which the large valve is mounted for movement toward and away from the main valve seat. A relatively small valve is positioned within the large valve and is carried by the valve stem. The smaller valve is biased toward engagement with a flange on the large valve and is cooperable with a seat positioned within the large valve to control the pilot flow. Flow through the large valve continues until the pressure in the outlet chamber, and downstream thereof, is sufficient to close both the large and small valves to prevent any downstream flow. However, upon a very slight drop in downstream pressure, the diaphragm will open the small valve to permit a small pilot flow downstream.

The above and other objects and features of the invention will appear more fully hereinafter from a consideration of the following description taken in connection with the accompanying drawing wherein:

FIG. 1 is a cross-sectional view of a preferred embodiment of the invention; and FIG. 2 is a fragmentary cross-sectional view of a detail.

While the double-seated pressure regulator valve has particular utility for controlling the gas supplied to a thermostatic regulator of a fluid fuel burner having a pilot take-off and is disclosed herein in that environment, this invention may find a wide field of usefulness wherever it is desired to control the flow of fluid.

Referring more particularly to FIG. 1, the double-seated pressure regulator valve shown therein includes a housing 10 having an inlet 12 and an outlet 14 adapted to threadedly receive suitable conduits. Inlet 12 may be connected to a conduit leading to a suitable source of fluid fuel and outlet 14 may be connected to a conduit leading to a thermostatic regulator of a fluid fuel burner having a pilot take-off.

A manually operable valve 16 and a pressure responsive valve 18 are disposed within housing 10 and control fluid flow between the inlet and the outlet. The manually operable valve 16 is positioned adjacent inlet 12 and comprises a tapered valve seat 20 which cooperates with a tapered plug valve member 22 to open and close the inlet 12. The plug valve member 22 is adapted to be rotated relative to seat 20 by a manually operable handle 24 carried by a stem 26 formed on the plug valve member 22. The plug valve member 22 is provided with communicating angular passages 28 and 30.

When the plug valve member 22 is rotated into the open position shown in FIG. 1, passage 28 is in register with inlet 12 while passage 30 is in register with a passage 32 communicating with an inlet chamber 34 within housing 10. The plug valve member 22 may be rotated ninety degrees to a closed position as is customary in such devices.

The interior of housing 10 defines an outlet chamber 36 communicating with outlet 14 and a horizontal main valve seat 38 which defines a circular passageway 40 between inlet chamber 34 and outlet chamber 36. Housing 10 has a vertical cylindrical portion 42 within outlet chamber 36 and positioned centrally of circular passageway 40. Cylindrical portion 42 has a central bore 44 therein for a purpose apparent hereinafter.

A pressure responsive means is provided for controlling the pressure responsive valve 18. This means takes the form of a circular diaphragm 46 mounted on a circular bottom portion 48 of housing 10 by means of a snap-on circular cover 50. Diaphragm 46 cooperates with the bottom wall 52 of bottom portion 48 to define a pressure control chamber 54 which communicates with outlet chamber 54 which communicates with outlet chamber 36. The outer side of diaphragm 46 is supported over a greater part of its area by a circular backing plate 56 horizontally secured at its center to one end of a movable valve stem 58 by means of a nut 60. Valve stem 58 is vertically slidable within bore 44 and it will be apparent that diaphragm 46, backing plate 56, and valve stem 58 are all vertically movable together in response to pressure variations in the pressure control chamber 54.

Valve stem 58 extends upwardly from cylindrical portion 42, through the center of main valve seat 38 into inlet chamber 34, and terminates in upper end 62 which extends outwardly of upper plate 64 which forms the top of casing 10. A disc 66 is secured to the valve stem 58 adjacent upper end 62 for a purpose apparent hereinafter.

Means are provided for biasing valve stem 58 upwardly. Such means takes the form of a lever 68 pivotable at its center about a fulcrum arm 70. One end 72 of lever 68 is adapted to engage the underside of disc 62 on stem 58 and the other end 74 is adapted to engage the underside of a head member 76 carried on the upper end of a vertically movable shaft 78. Shaft 78 extends through a horizontal support plate 80 and terminates in a horizontal disc 82 secured to the lower end of shaft 78. Shaft 78 is biased downwardly by means of a compression spring 84 positioned between plate 80 and disc 82. It will thus be apparent that end 74 of lever 68 will be biased downwardly and end 72 will be biased upwardly as viewed in FIG. 1.

The upper portion of inlet chamber 34 is sealed by means of a circular, resilient sealing diaphragm 86. Diaphragm 86 is mounted at the outer diameter thereof between an annular seal 88 and a recess 90 in housing 10 and at the center thereof between a nut 92 screwed on to stem 58 and a retaining disc 94 mounted on stem 58 beneath nut 92. Disc 94 is positioned on the underside of diaphragm 86 for a purpose to be hereinafter described.

The pressure responsive valve 18 comprises a main valve disc 96 which is horizontally mounted on stem 58 for movement into and out of engagement with main valve seat 38. An annual strip 98 of resilient material is secured to the underside of valve disc 96 so as to overlie main valve seat 38. Thus, annular strip 98 will seat on valve seat 38 when the valve disc 96 is in the closed position thereof as shown in FIG. 1. Valve disc 96 is formed with a central, vertically extending cylindrical portion 99 having a vertical central bore 100. Bore 100 is axially aligned with valve stem 58 and is adapted to allow valve stem 58 to move vertically therein.

Valve stem 58 has, at the portion thereof movable within bore 100, an outwardly extending annular flange 102. Projecting inwardly of bore 100 is an annular flange 104 formed on cylindrical portion 99 of valve disc 96. As flange 104 on valve disc 96 overlies flange 102 on valve stem 58, any upward movement of valve stem 58 after flanges 102 and 104 have come into contact will cause a corresponding upward movement of valve disc 96. Flange 104 of valve disc 96 is biased into engagement with flange 102 on valve stem 58 by means of a compression spring 105 positioned between retaining disc 94 and flange 104. It will be apparent that after valve stem 58 has moved downward to a point at which valve disc 96 is in engagement with valve seat 38, further downward movement of stem 58 will serve only to compress spring 105 as valve disc 96 can no longer move downwardly. The internal diameter of flange 104 is slightly greater than the diameter of the shaft portion 106 extending between flange 102 and retaining disc 94 on valve stem 58.

Valve stem 58 has a reduced diameter portion 107 immediately underneath flange 102. A resilient O-ring 108 is positioned about valve stem 58 at the reduced diameter portion 107. The internal diameter of O-ring 108 is greater than the diameter of the reduced portion 106 and the outer diameter of O-ring 108 is large enough to provide a slight interference fit with the diameter of bore 100. As O-ring 108 is positioned immediately beneath flange 102 on the valve stem 58, downward movement of stem 58 may be transmitted to the O-ring 108. The downward movement of valve stem 58 and O-ring 108 is limited by an annular valve seat 110 formed on the top of an annular projection 112 which extends vertically upward from cylindrical portion 42 on housing 10. Valve seat 110 is in axial alignment with O-ring 108 and extends within bore 100 when the valve disc 96 is in engagement with main valve seat 38. The outer diameter of annular projection 112 is less than the diameter of bore 100 for a purpose to be more fully described hereinafter.

The operation of the device is as follows:

With the parts of the device in the position shown in FIG. 1, the fluid fuel is permitted to flow from the source through inlet 12, through manual valve 16 via passageways 28 and 30, and through passageway 32 into inlet chamber 34. The flow of fluid from inlet chamber 34 into outlet chamber 36 and onward downstream will now be regulated by the pressure responsive valve 18 which is under the control of diaphragm 46. Diaphragm 46 is responsive to the pressure in pressure control chamber 54 which in turn is determined by the pressure in outlet chamber 36 and the downstream pressure.

Under normal operation, the pressure in pressure control chamber 54 will position diaphragm 46, along with valve stem 58, so that valve disc 96 is lifted out of engagement with main valve seat 38. In this position, flange 102 is in engagement with flange 104 under the bias of compression spring 105 and has moved valve disc 96 upwardly away from the main valve seat 38. It will be apparent that during this pressure condition in the outlet chamber 36, the only flow passageway between inlet chamber 34 and outlet chamber 36 is passageway 40.

As the pressure in outlet chamber 36 increases under the action of the fuel burner's thermostatic regulator (not shown) located downstream of outlet 14, diaphragm 46 will acutate valve stem 58 downwardly. Thus, valve disc 96, which is biased into engagement with flange 102 on valve stem 58, will also be moved downwardly under this action of diaphragm 46. At the point in this downward movement at which valve disc 96 just engages valve seat 38, the flow from inlet chamber 34 to outlet chamber 36 will be momentarily completely shut off as there can be no flow through bore 100 since flanges 102 and 104 are still in engagement. Further downward movement of valve stem 58 from this point under the action of diaphragm 46 will cause an override action of spring 105 and move the parts to the position illustrated in FIG. 2 wherein flanges 102 and 104 are shown out of engagement. It will be apparent that this override action of spring 105 creates an upward bias on valve stem 58 in addition to the constant upward bias of spring 84 so that a greater downward force on diaphragm 46 will be required to move valve stem 58 downwardly. Hence, a larger pressure increase in outlet chamber 36 per unit of downward movement of stem 58 is required once valve disc 96 has come into engagement with valve seat 38.

With the parts in the position illustrated in FIG. 2, there will be a small flow of fluid from inlet chamber 34 ot outlet chamber 36 by means of a passageway within bore 100. This flow is as follows: through the annular opening 114 between the outer diameter of flange 104 and shaft portion 106, around flange 102, through the annular opening 116 between the internal diameter of O-ring 108 and reduced shaft portion 107, through the space between valve seat 110 and O-ring 108, and through the annular opening 118 between the outer diameter of annular projection 112 and bore 110 into the outlet chamber 36. This small flow will be sufficient to sustain the pilot flame.

Should there be a further increase in the pressure in outlet chamber 36, the valve 18 may be moved into the position illustrated in FIG. 1. With the parts in this position, the flow from inlet chamber 34 to outlet chamber 36 will be completely shut off. Flange 102 has come into engagement with O-ring 108 and has moved O-ring 108 into engagement with valve seat 110. Hence, there is no longer any passageway either around flange 102 or between valve seat 110 and O-ring 108. It will thus be apparent that flange 102 functions as an auxiliary valve member cooperating with seating means comprising O-ring 108 and valve seat 110.

Upon a subsequent slight decrease in pressure in outlet chamber 36, the parts will return to the position shown in FIG. 2 and the small flow will be resumed. This invention makes it possible to regulate the pilot flow at pressures only slightly higher than the pressure at which the main flow is regulated, as for example, one-half to three-quarters p.s.i. Should the pressure downstream drop a sufficient amount, the diaphragm 46 will actuate valve stem 58 upwardly to re-open the main valve seat 38 and again permit a large flow of fluid from inlet chamber 34 to outlet chamber 36 through passage 40. It will thus be apparent that the pressure responsive valve 18 will recycle in the above manner to regulate the fluid flow through the device.

It is to be understood that although only one embodiment of this invention has been shown and described, the invention can be variously embodied and changes may be made in the construction and arrangement of parts without departing from the scope of the invention as defined by the appended claims.

I claim:
1. In a flow control device, the combination comprising a casing defining an inlet chamber, an outlet chamber and a main passageway therebetween, a main valve seat carried by said casing and intersecting said main passageway, a valve stem mounted in said casing for axial movement through a first and a second range within said main passageway, a main valve member mounted on said valve stem and biased for engagement with said main valve seat to control the flow through said main passageway, said main valve member being spaced from said stem for defining an auxiliary passageway between said inlet chamber and said outlet chamber, an auxiliary valve seat carried by said casing intermediate said main valve seat and said stem and intersecting said auxiliary passageway on the downstream side of said main valve member, and an auxiliary valve member carried by said valve stem adjacent said downstream side of said main valve member and being engageable with said auxiliary valve seat to control the flow through said auxiliary passageway, said auxiliary valve member being engagable with said downstream side of said main valve member during said first range of movement of said valve stem for actuating said main valve member against its bias out of engagement with said main valve seat, said auxiliary valve member being disengageable from said main valve member during said second range of movement of said valve stem and into engagement with said auxiliary valve seat.

2. In a flow control device, the combination comprising a casing defining an inlet chamber, an outlet chamber and a main passageway therebetween, a main valve seat carried by said casing and intersecting said main passageway, a valve stem mounted for axial movement within said main passageway, a main valve member slidably mounted on said valve stem and cooperable with said main valve seat for controlling the flow through said main passageway, said main valve member being spaced from said stem for defining an auxiliary passageway between said inlet chamber and said outlet chamber, an auxiliary valve seat carried by said casing intermediate said main valve seat and said stem and intersecting said auxiliary passageway on the downstream side of said main valve member, an auxiliary valve member on said valve stem cooperable with said auxiliary valve seat for controlling the flow through said auxiliary passageway and engageable with the downstream side of said main valve member for actuating the same relative to said main valve seat, means responsive to a first controlling condition for actuating said valve stem to a first position wherein said auxiliary valve member engages said auxiliary valve seat to shut off flow through said auxiliary passageway, said means being responsive to a second condition for actuating said valve stem to a second position wherein said auxiliary valve member is disengaged from said auxiliary valve seat to allow flow through said auxiliary passageway, said means being responsive to a third condition for actuating said valve stem to a plurality of open positions wherein said auxiliary valve member engages the downstream side of said main valve member to maintain the same out of engagement with said main valve seat to allow flow through the main passageway, and means for maintaining said main valve member in engagement with said main valve seat when said valve stem is in said first and second positions, said auxiliary valve member being out of engagement with said main valve member in said first and second positions.

3. A device as claimed in claim 2 wherein said control means comprises a diaphragm member movable in response to pressure variations in said outlet chamber and operatively connected to said valve stem.

4. A device as claimed in claim 3 wherein said auxiliary valve member comprises an annular flange formed on said valve stem and said auxiliary valve seat means comprises an annular seat extending radially about said valve stem and a resilient ring member encircling said valve stem and positioned between said annular flange and said annular seat.

References Cited in the file of this patent
UNITED STATES PATENTS

| | | |
|---|---|---|
| 824,681 | Ashley | June 26, 1906 |
| 844,946 | Lowe | Feb. 19, 1907 |
| 1,064,609 | Caldwell et al. | June 10, 1913 |

FOREIGN PATENTS

| | | |
|---|---|---|
| 625,953 | Great Britain | July 16, 1949 |